United States Patent
Lee et al.

(10) Patent No.: US 8,949,604 B2
(45) Date of Patent: Feb. 3, 2015

(54) SYSTEM AND METHOD FOR ISSUING AN AUTHENTICATION KEY FOR AUTHENTICATING A USER IN A CPNS ENVIRONMENT

(75) Inventors: Jeong Hoon Lee, Seoul (KR); Hun Huh, Yongin-si (KR); Eun Bok Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 0 days.

(21) Appl. No.: 13/824,117

(22) PCT Filed: Nov. 30, 2011

(86) PCT No.: PCT/KR2011/009196
§ 371 (c)(1),
(2), (4) Date: Mar. 15, 2013

(87) PCT Pub. No.: WO2012/099330
PCT Pub. Date: Jul. 26, 2012

(65) Prior Publication Data
US 2013/0179688 A1    Jul. 11, 2013

(30) Foreign Application Priority Data
Jan. 20, 2011  (KR) ........................ 10-2011-0005787

(51) Int. Cl.
| | |
|---|---|
| H04L 9/00 | (2006.01) |
| H04L 29/06 | (2006.01) |
| H04L 9/08 | (2006.01) |
| H04L 9/32 | (2006.01) |

(Continued)

(52) U.S. Cl.
CPC .............. *H04L 63/08* (2013.01); *H04L 9/0822* (2013.01); *H04L 9/3226* (2013.01); *H04W 12/04* (2013.01); *H04L 2209/80* (2013.01); *H04W 12/06* (2013.01); *H04L 63/0884* (2013.01)
USPC ................... 713/168; 713/153; 726/2; 726/5; 726/6

(58) Field of Classification Search
CPC ..... H04L 9/0822; H04L 9/3226; H04L 63/08; H04L 2209/80; H04L 29/06; H04W 2/04; H04W 12/06
USPC ............................... 713/168, 153; 726/2, 5, 6
See application file for complete search history.

(56) References Cited

U.S. PATENT DOCUMENTS

2004/0083393 A1 *  4/2004  Jordan et al. ................... 713/202
2007/0266246 A1 * 11/2007  Lee et al. ....................... 713/168

(Continued)

FOREIGN PATENT DOCUMENTS

| | | |
|---|---|---|
| EP | 2367370 A1 | 9/2011 |
| JP | 2000148689 A | 5/2000 |

(Continued)

OTHER PUBLICATIONS

International Search Report mailed Jul. 25, 2012 for PCT/KR2011/009196.

(Continued)

*Primary Examiner* — Baotran N To
(74) *Attorney, Agent, or Firm* — Lowe Hauptman & Ham, LLP

(57) ABSTRACT

The present invention relates to a system and method for issuing an authentication key for authenticating a user in a CPNS environment. The system comprises a user terminal, a gateway and a CPNS device. The user terminal is equipped with a short-range wireless communication function, requests the gateway to register terminal information including an ID and password, encrypts the terminal information including the ID and password using the password, transmits an authentication request signal including the encrypted terminal information to the gateway, and receives an authentication key generated by a CPNS device. The CPNS device stores the terminal information, performs user authentication by decrypting the encrypted terminal information in response to the authentication request, generates an authentication key for the CPNS when a user is authenticated, encrypts the generated authentication key using the password, and transmits the encrypted authentication key to the user terminal through the gateway.

7 Claims, 5 Drawing Sheets

(51) Int. Cl.
*H04W 12/04* (2009.01)
*H04W 12/06* (2009.01)

(56) References Cited

U.S. PATENT DOCUMENTS

2011/0093704 A1* 4/2011 Park et al. .................. 713/168
2013/0167210 A1* 6/2013 Chu et al. ..................... 726/6

FOREIGN PATENT DOCUMENTS

| JP | 2003092775 A | 3/2003 |
|----|--------------|--------|
| KR | 1020040065466 | 7/2004 |
| KR | 1020070046966 | 5/2007 |
| KR | 1020090120550 | 11/2009 |
| KR | 1020100054187 | 5/2010 |
| WO | 2010053241 A1 | 5/2010 |
| WO | 2010098527 A1 | 9/2010 |

OTHER PUBLICATIONS

Japanese Office Action for application No. 2013-550384 dated Jun. 10, 2014.

* cited by examiner

SYSTEM AND METHOD FOR ISSUING AN AUTHENTICATION KEY FOR AUTHENTICATING A USER IN A CPNS ENVIRONMENT

TECHNICAL FIELD

The present invention relates to a system and method for issuing an authentication key for user authentication in a converged personal network service (CPNS) environment and, more particularly, to a system and method for issuing an authentication key for user authentication in a CPNS environment, in which when an ID and password for use of a CPNS are received, a user terminal equipped with a short-range wireless communication function encrypts terminal information including the ID and password using the password, transmits an authentication request signal including the encrypted terminal information to a gateway, and receives an authentication key generated by a CPNS device, and the CPNS device performs user authentication by decrypting the encrypted terminal information in response to the authentication request from the gateway, generates the authentication key for the CPNS if a user is authenticated, encrypts the authentication key using the password, and transmits the encrypted authentication key to the user terminal through the gateway.

BACKGROUND ART

The purpose of a converged personal network service (CPNS) environment is to allow a user terminal, which is capable of only performing short-range wireless communication but incapable of performing cellular communication with a mobile communication network, to perform short-range wireless communication with a mobile communication terminal, which functions as a gateway of a personal network (PN) service, thus using a data service which can be provided through a cellular communication network.

The user terminal, which is capable of only performing short-range wireless communication but incapable of performing cellular communication with a mobile communication network, is subjected to an initialization process to use the CPNS.

That is, the user terminal searches for a gateway, which will function as a gateway of a personal network (PN), to use the CPNS. Then, the gateway determines whether the CPNS is available to the user terminal based on terminal information from the user terminal. If it is determined that the CPNS is available, the gateway transmits an authentication message indicating that the CPNS is available to the user terminal.

The user terminal can use the data service only after the above initialization process has been performed.

However, the above-described conventional method has a disadvantage in that it requires a separate authentication process for each terminal when a user uses several terminals in the CPNS environment.

PRIOR ART LITERATURE

Patent Literature

Korean Patent No. 10-0608495 (Aug. 8, 2006), entitled "Integrated Authentication System and Method in Internal Network, and Recording Medium"

DISCLOSURE

Technical Problem

Accordingly, the present invention has been made to solve the above-described problems, and an object of the present invention is to provide a system and method for issuing an authentication key for user authentication in a CPNS environment, which can easily authenticate several terminals used by a user in the CPNS environment and provide a convenient key management method to ensure security for each terminal.

Another object of the present invention is to provide a system and method for issuing an authentication key for user authentication in a CPNS environment, which can effectively issue the authentication key using a password set by a user in the same manner of using a pre-assigned authentication key such as a credential of a USIM.

Technical Solution

According to an aspect of the present invention for achieving the above objects, there is provided a system for issuing an authentication key for user authentication in a converged personal network service (CPNS) environment, the system comprising: a user terminal which is equipped with a short-range wireless communication function, requests a gateway to register terminal information including an ID and password, encrypts the terminal information including the ID and password using the password when the ID and password for use of a CPNS are input, transmits an authentication request signal including the encrypted terminal information to the gateway, and receives an authentication key generated by a CPNS device; the gateway which is equipped with a mobile communication function or a short-range wireless communication function, transmits the terminal information to the CPNS device through a mobile communication network in response to the terminal information registration request from the user terminal, and when the authentication request signal is received from the user terminal, transmits the encrypted terminal information to the CPNS device to request authentication; and the CPNS device which stores the terminal information from the gateway, performs user authentication by decrypting the encrypted terminal information in response to the authentication request from the gateway, generates an authentication key for the CPNS when a user is authenticated, encrypts the generated authentication key using the password, and transmits the encrypted authentication key to the user terminal through the gateway.

The gateway may store the terminal information in response to the terminal information registration request from the user terminal, perform user authentication by decrypting the encrypted terminal information when the authentication request signal is received from the user terminal, generate an authentication key for the CPNS when the user is authenticated, encrypt the generated authentication key using the password, and transmit the encrypted authentication key to the user terminal and the CPNS device.

According to another aspect of the present invention, there is provided a user terminal comprising: a communication interface unit which transmits and receives information through a communication network; an input unit which receives a user command; an encryption unit which, when an ID and password for use of a CPNS are input through the input unit, encrypts terminal information including the ID and password using the password; an authentication request unit which transmits an authentication request signal including the encrypted terminal information to a gateway through the communication interface unit; and an authentication key management unit which receives an authentication key, generated by a CPNS device in response to the authentication request, from the gateway and stores the received authentication key.

The user terminal may further comprise a terminal information registration request unit which transmits the terminal information including the ID and password input through the input unit to the gateway through a short-range wireless communication network to request the CPNS device to register the terminal information.

The terminal information registration request unit may encrypt the terminal information including the ID and password using the password and transmit the encrypted terminal information to the gateway through the short-range wireless communication network to request the CPNS device to register the terminal information.

The user terminal may further comprise a service execution unit which executes the CPNS using the authentication key.

The user terminal may further comprise: an authentication key generation unit which, when the ID and password for the use of the CPNS are input through the input unit, stores the ID and password and, at the same time, generates an authentication key; and an authentication supply unit which encrypts the terminal information including the ID and password and the generated authentication key and transmits the encrypted terminal information and authentication key to the CPNS device.

According to still another aspect of the present invention, there is provided a CPNS device comprising: a communication interface unit which transmits and receives information through a communication network; a terminal information database which stores terminal information including an ID and password for each user terminal and an authentication key for each user terminal; a terminal information registration unit which registers the terminal information in the terminal information database when registration of the terminal information is requested through the communication interface unit; an authentication unit which, when an authentication request signal is received through the communication interface unit, decrypts the terminal information included in the authentication request signal and performs user authentication based on whether the decrypted terminal information is present in the terminal information database; an authentication key generation unit which, when a user is authenticated, generates an authentication key for a CPNS; and an authentication key supply unit which encrypts the generated authentication key using the password included in the terminal information and supplies the encrypted authentication key to a corresponding user terminal through the communication interface unit.

The terminal information may comprise at least one selected from the group consisting of an ID, a password, a terminal serial number, a terminal model, and a terminal type.

According to yet another aspect of the present invention, there is provided a method for issuing an authentication key for user authentication in a CPNS environment, the method comprising the steps of: (a) transmitting, at a user terminal, an authentication request signal including encrypted terminal information to a gateway through a short-range wireless communication network; (b) storing, at the gateway, the encrypted terminal information in the authentication request signal and, at the same time, transmitting the encrypted terminal information to a CPNS device through a mobile communication network to request authentication; (c) performing, at the CPNS device, user authentication by decrypting the encrypted terminal information in response to the authentication request from the gateway; (d) generating, at the CPNS device, an authentication key for a CPNS when a user is authenticated; and (e) encrypting, at the CPNS device, the generated authentication key using the password and providing the encrypted authentication key to the user terminal through the gateway.

According to still yet another aspect of the present invention, there is provided a method for issuing an authentication key for user authentication in a CPNS environment, the method performed by a user terminal and comprising the steps of: (a) when an ID and password for use of a CPNS are input by a user, encrypting terminal information including the ID and password using the password; (b) transmitting an authentication request signal including the encrypted terminal information to a gateway; (c) receiving an authentication key generated by a CPNS device in response to the authentication request through the gateway; and (d) accessing the CPNS device based on the authentication key and executing the CPNS.

The method may further comprise, before step (a), the step of requesting the gateway to register the terminal information including the ID and password input by the user.

According to a further aspect of the present invention, there is provided a method for issuing an authentication key for user authentication in a CPNS environment, the method performed by a CPNS device and comprising the steps of: (a) when an authentication request signal for use of a CPNS is received, decrypting encrypted terminal information included in the authentication request signal; (b) determining whether the decrypted terminal information is present in a pre-stored terminal information database; (c) when the terminal information is present in the terminal information database, generating an authentication key for the CPNS; (d) encrypting the generated authentication key using a password included in the terminal information; and (e) providing the encrypted authentication to a corresponding user terminal.

The method may further comprise, before step (a), the step of registering the terminal information when registration of the terminal information including an ID and password is requested by the user terminal.

Advantageous Effects

As described above, according to the present invention, when a user uses several terminals in a CPNS environment, it is possible to easily authenticate the terminals and provide a convenient key management method to ensure security for each terminal.

Moreover, since the user easily remembers his or her password and maintains the confidentiality of the password, it is possible to simplify an initial authentication key assignment method for use of a CPNS using a user terminal.

Figure 1:
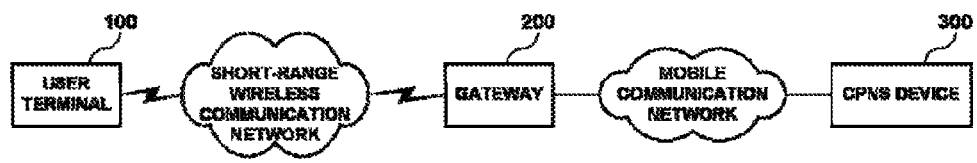
FIG. 1 is a diagram showing a system for issuing an authentication key for user authentication in a CPNS environment in accordance with an embodiment of the present invention.

DESCRIPTION OF REFERENCE NUMERALS 100, 500, 800: user terminal
102, 302, 602, 802: communication interface unit
104, 804: input unit 106, 806: output unit
108, 808: storage unit
110: terminal information registration request unit
112: encryption unit
114: authentication request unit
116: authentication key management unit
117: service execution unit
200, 600: gateway 300: CPNS device
304, 604: terminal information registration unit
306, 606: terminal information database
308, 608: authentication unit
310, 610, 810: authentication key generation unit
312, 612, 812: authentication key supply unit
814: service execution unit

MODE FOR INVENTION

Details of the foregoing objects, technical construction and corresponding operational effects of the present invention will be more clearly understood by the following detailed descriptions based on the drawings attached to the specification of the present invention.

FIG. 1 is a diagram showing a system for issuing an authentication key for user authentication in a CPNS environment in accordance with an embodiment of the present invention.

Referring to FIG. 1, a system for issuing an authentication key for user authentication in a CPNS environment in accordance with an embodiment of the present invention comprises a user terminal 100, which is equipped with a short-range wireless communication function, a gateway 200, which is equipped with a mobile communication function or a short-range wireless communication function to provide an interface with the user terminal 100 and a CPNS device 300, and the CPNS device 300 which issues an authentication key to allow the user terminal 100 to use a CPNS.

The user terminal 100, which is equipped with a short-range wireless communication function, requests the gateway 200 to register terminal information including an ID and password input by a user such that the terminal information is registered in the CPNS device 300. The terminal information includes the ID and password input by the user, and the terminal's serial number, model, type, etc.

Moreover, when the ID and password for the use of the CPNS are input by the user, the user terminal 100 encrypts the terminal information including the ID and password using the password, transmits an authentication request signal including the encrypted terminal information to the gateway 200, and receives an authentication key generated by the CPNS device 300. Here, the authentication key received from the CPNS device 300 is an encrypted authentication key, and the user terminal 100 stores the encrypted authentication key and uses the CPNS using the received authentication key.

The user terminal 100 may be a portable terminal equipped with a short-range wireless communication function such as a personal multimedia player (PMP), an MP3 player, a vehicle navigation terminal, a cellular phone, a game console, etc.

If the user terminal 100 needs to transmit and receive information through a mobile communication network, the user terminal 100 may further have a mobile communication function.

Here, the short-range wireless communication network may include any type of communication network capable of performing short-range wireless communication such as wireless LAN, Bluetooth, Ultra-WideBand (UWB), Wi-Fi, etc.

The user terminal 100 for performing the above functions will be described in more detail with reference to FIG. 2 later.

The gateway 200 is equipped with a mobile communication function or a short-range wireless communication function, stores the terminal information in response to the terminal information registration request from the user terminal 100 and, at the same time, transmits the terminal information to the CPNS 300 through the mobile communication network.

Moreover, when the authentication request signal is received from the user terminal 100, the gateway 200 transmits the encrypted terminal information included in the authentication request signal to the CPNS 300, thus requesting authentication.

Although it has been described that the communication network that connects the gateway 200 and the CPNS 300 is limited to the mobile communication network, the communication network may include any type of communication network such as a mobile communication network, a short-range wireless communication network, a wired communication network, etc.

The gateway 200 may be a wired terminal such as a personal computer (PC) that performs communication through a wired network (such as Internet), a mobile communication terminal such as a cellular phone, PDA, etc. that can use a wireless Internet through a mobile communication network, or a terminal including the functions of both the wired terminal and the mobile communication terminal.

Accordingly, the gateway 200 may be a wired terminal, a wireless terminal, a short-range wireless terminal, etc., and may perform both wired and wireless communications.

The CPNS device 300 receives the terminal information from the gateway 200, stores the received terminal information, performs user authentication by decrypting the encrypted terminal information in response to the authentication request from the gateway 200, and if a user is authenticated, generates an authentication key for the CPNS.

Moreover, the CPNS device 300 encrypts the authentication key using the password and provides the encrypted authentication key to the user terminal 100 through the gateway 200.

The CPNS device 300 for performing the above functions will be described in more detail with reference to FIG. 3 later.

Although the method, in which one terminal 100 requests the registration of the terminal information and receives the authentication key based on the ID and password for the use of the CPNS, has been described, once the terminal information is registered in the CPNS device 300, the CPNS may be used by several other terminals receiving the authentication key based on the ID and password.

The above-described method for issuing the authentication key for the user authentication may be used in the user authentication for use of a cloud computing service.

According to the cloud computing service, users can access a cloud network through user terminals, each performing network access and basic operating functions only, at any place to perform operations requiring mass storage devices and high-performance computing resources, thus receiving enhanced services. Here, the user terminal encrypts the ID and password for the access to the cloud network to use the cloud computing service using the password, and the could network provides an authentication key to the user terminal such that the user terminal can use the cloud computing service. Here, the cloud network, which is illustrated for convenience of description, may be illustrated as a cloud server or CPNS device for providing the cloud computing service. Here, the CPNS device integrates data centers distributed in several places using a virtualization technology and provides a service required by the users. A service user does not have to install and use necessary computing resources such as application, storage, operating system (OS), security, etc. in his or her terminal, but selects and uses desired services in virtual space created by the virtualization technology at a desired time.

Figure 2:
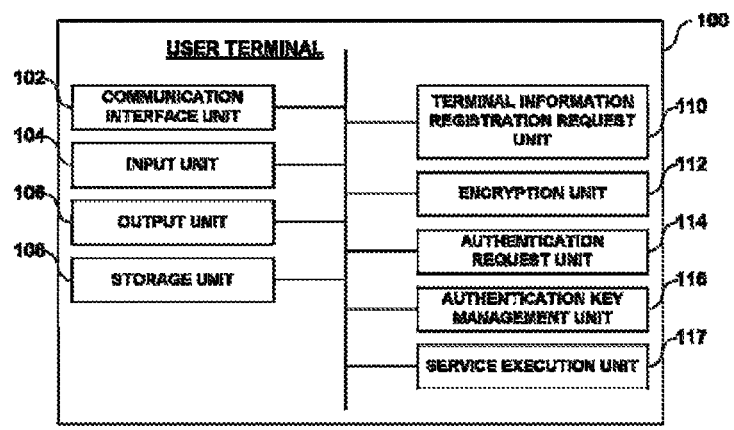
FIG. 2 is a block diagram schematically showing the configuration of a user terminal shown in FIG. 1.

FIG. 2 is a block diagram schematically showing the configuration of the user terminal shown in FIG. 1.

Referring to FIG. 2, the user terminal 100 comprises a communication interface unit 102 for transmitting and receiving information through a short-range wireless communication network, an input unit 104 for receiving a user command, an output unit 106, a storage unit 108, a terminal information registration request unit 110, an encryption unit 112, an authentication request unit 114, an authentication key management unit 116, and a service execution unit 117.

The terminal information registration request unit 110 transmits terminal information including an ID and password input through the input unit 104 to a gateway through a short-range wireless communication network to request a CPNS device to register the terminal information. The terminal information includes the ID and password input by the user, and the terminal's serial number, model, type, etc.

Moreover, the terminal information registration request unit 110 may encrypt the terminal information including the ID and password using the password and transmit the encrypted terminal information to the gateway through the short-range wireless communication network to request the CPNS device to register the terminal information.

When the ID and password for the use of the CPNS are input through the input unit 104, the encryption unit 112 encrypts the terminal information including the ID and password using the password. Here, the encryption unit 112 may encrypt the terminal information including the ID and password, the terminal's serial number, etc. using the password.

The authentication request unit 114 transmits an authentication request signal including the terminal information encrypted by the encryption unit 112 to the gateway through the communication interface unit 102.

The authentication key management unit 116 receives an authentication key generated by the CPNS device in response to the authentication request from the authentication request unit 114 and stores the received authentication key. Here, the authentication key received through the gateway may be an authentication key generated and encrypted by the CPNS device.

The service execution unit 117 executes the CPNS using the authentication key stored in the authentication key management unit 116. That is, the service execution unit 117 accesses the CPNS device based on the authentication key and executes the CPNS.

Figure 3:
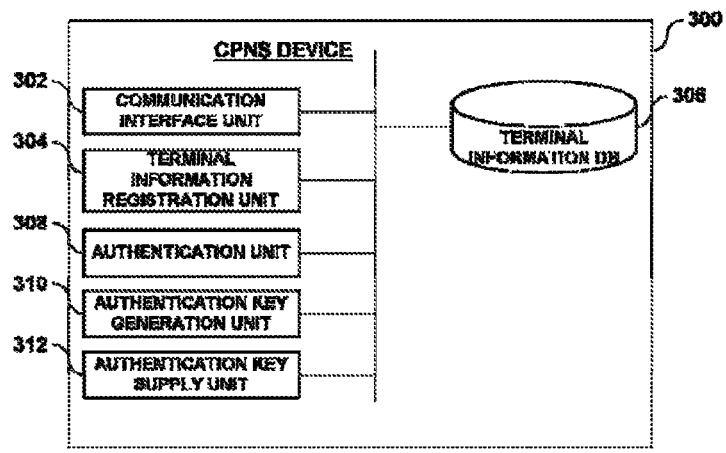
FIG. 3 is a block diagram schematically showing the configuration of a CPNS device shown in FIG. 1.

FIG. 3 is a block diagram schematically showing the configuration of the CPNS device shown in FIG. 1.

Referring to FIG. 3, the CPNS device 300 comprises a communication interface unit 302 for transmitting and receiving information through a mobile communication network, a terminal information database 306, a terminal information registration unit 304, an authentication unit 308, an authentication key generation unit 310, and an authentication key supply unit 312.

In the terminal information database 306, terminal information including an ID and password of a user terminal and an authentication key are mapped to each other. Here, the terminal information may include the user terminal's serial number, model, type, etc.

When the registration of the terminal information including the ID and password is requested through the communication interface unit 302, the terminal information registration unit 304 stores the terminal information in the terminal information database 306.

When an authentication request signal is received from a gateway through the communication interface unit 302, the authentication unit 308 decrypts the terminal information included in the authentication request signal and performs user authentication based on whether the decrypted terminal information is present in the terminal information database 306. That is, the authentication unit 308 determines whether the ID and password included in the terminal information are present in the terminal information database 306. If it is determined that the ID and password are present in the terminal information database 306, the authentication unit 308 determines that the user is an authenticated user.

When it is determined by the authentication unit 308 that the user is authenticated, the authentication key generation unit 310 generates an authentication key for the CPNS.

The authentication key supply unit 312 encrypts the generated authentication key using the password and supplies the encrypted authentication key to a corresponding user terminal through the gateway.

Figure 4:
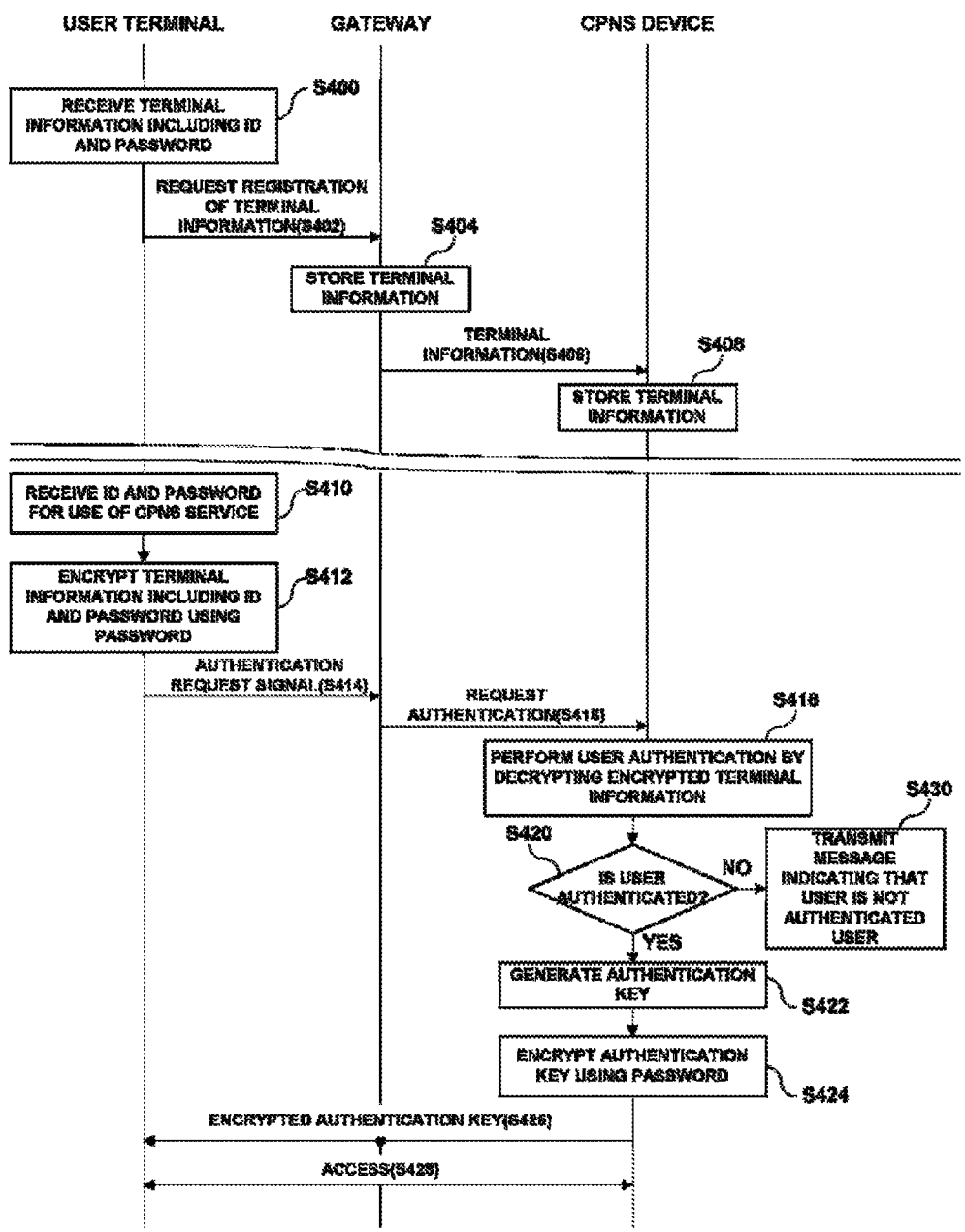
FIG. 4 is a diagram showing a method for issuing an authentication key for user authentication in a CPNS environment in accordance with an embodiment of the present invention.

FIG. 4 is a diagram showing a method for issuing an authentication key for user authentication in a CPNS environment in accordance with an embodiment of the present invention.

Referring to FIG. 4, when a user who wants to register terminal information inputs an ID and password (S400), a user terminal requests a gateway to register the terminal information including the ID and password (S402).

The gateway stores the terminal information in response to the terminal information registration request from the user terminal (S404) and transmits the terminal information to a CPNS device through a mobile communication network (S406).

The CPNS device stores the terminal information from the gateway (S408).

When the user terminal receives the ID and password for the use of the CPNS from the user later (S410), the user terminal encrypts the terminal information including the ID and password using the password (S412).

Then, the user terminal transmits an authentication request signal including the encrypted terminal information to the gateway through a short-range wireless communication network (S414).

The gateway stores the encrypted terminal information in the authentication request signal and, at the same time, transmits the encrypted terminal information to the CPNS device through the mobile communication network, thus requesting authentication (S416).

Then, the CPNS device performs user authentication by decrypting the encrypted terminal information in response to the authentication request from the gateway (S418). That is, the CPNS device performs the user authentication based on whether the decrypted terminal information is present in a pre-stored database.

If it is determined that the user is authenticated (S420), the CPNS device generates an authentication key for the CPNS (S422) and encrypts the generated authentication key using the password (S424).

Then, the CPNS device provides the encrypted authentication key to the user terminal through the gateway (S426).

Thus, the user terminal accesses the CPNS device through the gateway using the authentication key and performs the CPNS (S428).

If it is determined in step S420 that the user is not an authenticated user, the CPNS device transmits a message indicating that the user is not the authenticated user to the user terminal through the gateway (S430).

If the password of the user is continuously used as a key, there is a risk of exposure, and thus the password serves as a "temporary credential" until the user authentication is completed and the authentication key is transmitted, and the authentication key issued by the CPNS device is used later.

Figure 5:
FIG. 5 is a diagram showing a system for issuing an authentication key for user authentication in a CPNS environment in accordance with another embodiment of the present invention.

FIG. 5 is a diagram showing a system for issuing an authentication key for user authentication in a CPNS environment in accordance with another embodiment of the present invention.

Referring to FIG. 5, a system for issuing an authentication key for user authentication in a CPNS environment comprises a user terminal 500, which is equipped with a short-range wireless communication function, and a gateway 600, which is equipped with a mobile communication function or a short-range wireless communication function to issue an authentication key such that the user terminal 500 can use a CPNS.

The user terminal 500 requests the gateway 600 to register terminal information including an ID and password input by a user, encrypts the terminal information including the ID and password using the password when the ID and password for the use of the CPNS are input, transmits an authentication request signal including the encrypted terminal information to the gateway 600, and receives an authentication key from the gateway 600.

The user terminal 500 performing the above-described functions corresponds to that of FIG. 2, and thus its detailed description will be omitted.

The gateway 600 stores the terminal information in response to the terminal information registration request from the user terminal 500.

Moreover, when the authentication request signal is received from the user terminal 500, the gateway 600 performs user authentication by decrypting the encrypted terminal information included in the authentication request signal and, if the user is authenticated, generates an authentication key for the CPNS.

Then, the gateway 600 encrypts the generated authentication key using the password and provides the encrypted authentication key to the user terminal 500.

Moreover, the gateway 600 may provide the encrypted authentication key to a CPNS device (not shown). Then, the user terminal 500 may access the CPNS device based on the authentication key and use the CPNS.

The gateway 600 for performing the above functions will be described in more detail with reference to FIG. 6 later.

The connection interface between the user terminal 500 and the gateway 600 is a connection interface which can perform various wired and wireless communications such as universal serial bus (USB), Serial, Bluetooth, etc.

Figure 6:
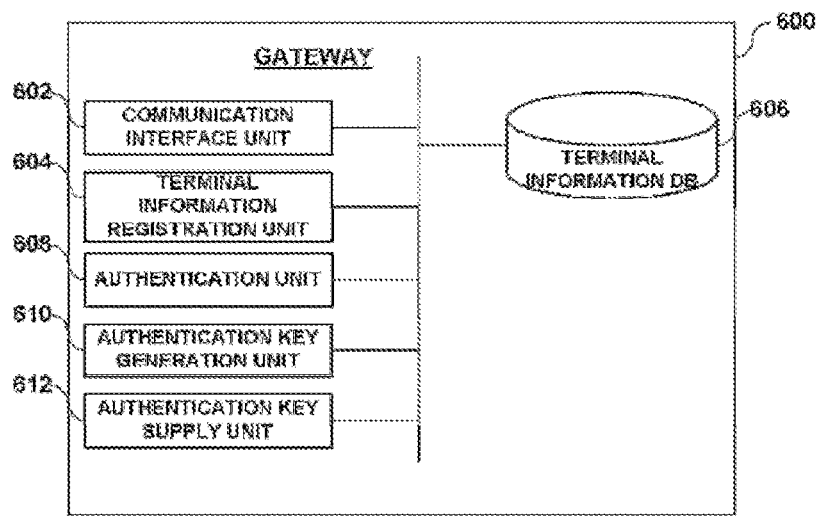
FIG. 6 is a block diagram schematically showing the configuration of a gateway shown in FIG. 5.

FIG. 6 is a block diagram schematically showing the configuration of the gateway shown in FIG. 5.

Referring to FIG. 6, the gateway 600 comprises a communication interface unit 602 for transmitting and receiving information through a communication network, a terminal information database 606, a terminal information registration unit 604, an authentication unit 608, an authentication key generation unit 610, and an authentication key supply unit 612.

In the terminal information database 606, terminal information including an ID and password of a user terminal and an authentication key are mapped to each other.

When the registration of the terminal information including the ID and password is requested through the communication interface unit 602, the terminal information registration unit 604 stores the terminal information in the terminal information database 606. The terminal information includes the ID and password, and the terminal's serial number, model, type, etc.

When an authentication request signal for use of a CPNS is received from the user terminal, the authentication unit 608 decrypts the terminal information included in the authentication request signal and performs user authentication based on whether the decrypted terminal information is present in the terminal information database 606.

When it is determined by the authentication unit 608 that the user is authenticated, the authentication key generation unit 610 generates an authentication key for the CPNS.

The authentication key supply unit 612 encrypts the generated authentication key using the password and supplies the encrypted authentication key to the user terminal.

Moreover, the authentication key supply unit 612 may provide the encrypted authentication key to a CPNS device (not shown).

Figure 7:
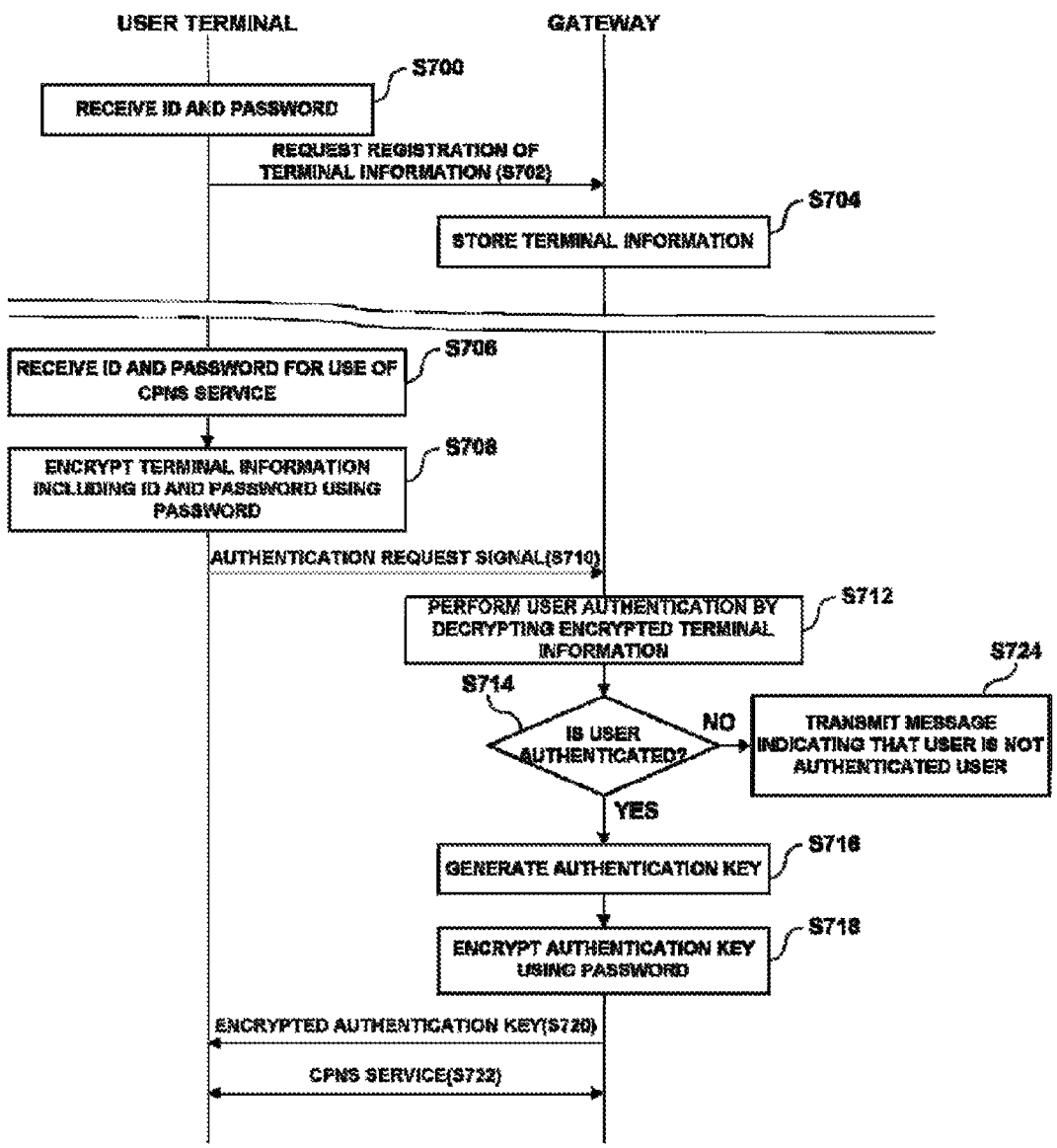
FIG. 7 is a diagram showing a method for issuing an authentication key for user authentication in a CPNS environment in accordance with another embodiment of the present invention.

FIG. 7 is a diagram showing a method for issuing an authentication key for user authentication in a CPNS environment in accordance with another embodiment of the present invention.

Referring to FIG. 7, when a user who wants to register terminal information inputs an ID and password (S700), a user terminal requests a gateway to register the terminal information including the ID and password (S702).

The gateway stores the terminal information in response to the terminal information registration request from the user terminal (S404). Here, the gateway may transmit the terminal information to a CPNS device.

When the user terminal receives an ID and password for use of a CPNS later (S706), the user terminal encrypts the terminal information including the ID and password using the password (S708).

Then, the user terminal transmits an authentication request signal including the encrypted terminal information to the gateway through a communication network (S710).

The gateway performs user authentication by decrypting the encrypted terminal information in response to the authentication request from the gateway (S712). That is, the gateway performs the user authentication based on whether the decrypted terminal information is present in a pre-stored database.

If it is determined that the user is authenticated (S714), the gateway generates an authentication key for the CPNS (S716) and encrypts the generated authentication key using the password (S718).

Then, the gateway provides the encrypted authentication key to the user terminal (S720). Here, the gateway transmits the encrypted authentication key to the CPNS device.

Thus, the user terminal accesses the CPNS device using the authentication key and performs the CPNS (S722).

If it is determined in step S714 that the user is not an authenticated user, the gateway transmits a message indicating that the user is not the authenticated user to the user terminal (S724).

Figure 8:
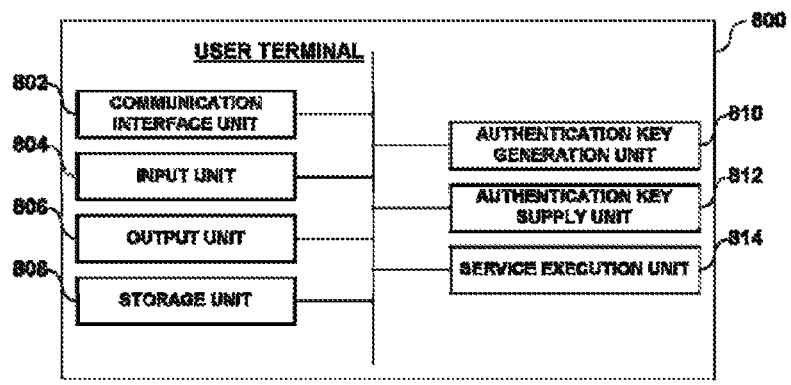
FIG. 8 is a block diagram showing the configuration of a user terminal capable of issuing an authentication key for user authentication in a CPNS environment in accordance with still another embodiment of the present invention.

FIG. 8 is a block diagram showing the configuration of a user terminal capable of issuing an authentication key for user authentication in a CPNS environment in accordance with still another embodiment of the present invention.

Referring to FIG. 8, a user terminal capable of issuing an authentication key for user authentication in a CPNS environment comprises a communication interface unit 802 for transmitting and receiving information through a communication network, an input unit 804 for receiving a user command, an output unit 806, a storage unit 808, an authentication key generation unit 810, an authentication key supply unit 812, and a service execution unit 814.

When an ID and password for use of a CPNS are input through the input unit 804, the authentication key generation unit 810 stores the ID and password and, at the same time, generates an authentication key.

The authentication key supply unit 812 encrypts terminal information including the ID and password and the generated authentication key using the password and transmits the encrypted terminal information and authentication key to a CPNS device.

Then, the CPNS device searches for the terminal information from a pre-stored terminal information database, maps the authentication key to the terminal information, and stores the authentication key. Then, the CPNS device allows the user terminal to access the CPNS based on the authentication key, thus providing the CPNS.

The service execution unit 814 executes the CPNS based on the authentication key generated by the authentication key generation unit 810.

Figure 9:
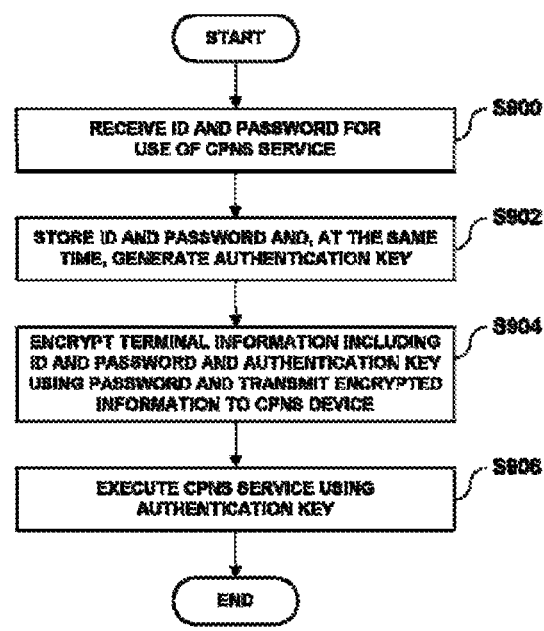
FIG. 9 is a flowchart showing how a user terminal shown in FIG. 8 issues an authentication key for user authentication in a CPNS environment.

FIG. 9 is a flowchart showing how the user terminal shown in FIG. 8 issues an authentication key for user authentication in a CPNS environment.

Referring to FIG. 9, when an ID and password for use of a CPNS are input from a user (S900), the user terminal stores the ID and password and, at the same time, generates an authentication key (S902).

Then, the user terminal encrypts terminal information including the ID and password and the generated authentication key using the password and transmits the encrypted terminal information and authentication key to a CPNS device (S904). That is, the user terminal provides the terminal information including the ID and password, the authentication key, etc. to the CPNS device such that the user can use the CPNS using another terminal later.

The user terminal executes the CPNS using the authentication key (S906).

While the embodiments of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The invention claimed is:

1. A system for issuing an authentication key for user authentication in a converged personal network service (CPNS) environment, the system comprising:

a user terminal which is equipped with a short-range wireless communication function, requests a gateway to register terminal information including an ID and password, encrypts the terminal information including the ID and password using the password when the ID and password for use of a CPNS are input, transmits an authentication request signal including the encrypted terminal information to the gateway, and receives an authentication key generated by a CPNS device;

the gateway which is equipped with a mobile communication function or a short-range wireless communication function, transmits the encrypted terminal information to the CPNS device through a mobile communication network in response to the terminal information registration request from the user terminal, and when the authentication request signal is received from the user terminal, transmits the encrypted terminal information to the CPNS device to request authentication; and the CPNS device which stores the encrypted terminal information from the gateway, performs user authentication by decrypting the encrypted terminal information in response to the authentication request from the gateway, generates an authentication key for the CPNS when a user is authenticated, encrypts the generated authentication key using the password, and transmits the encrypted authentication key to the user terminal through the gateway, wherein the gateway stores the encrypted terminal information in response to the terminal information registration request from the user terminal, performs user authentication by decrypting the encrypted terminal information when the authentication request signal is received from the user terminal, generates an authentication key for the CPNS when the user is authenticated, encrypts the generated authentication key using the password, and transmits the encrypted authentication key to the user terminal and the CPNS device.

2. The system of claim 1, wherein the CPNS device comprises:

a communication interface unit which transmits and receives information through the mobile communication network;

a terminal information database which stores terminal information including the ID and password for each user terminal and the authentication key for the each user terminal;

a terminal information registration unit which registers the terminal information in the terminal information database when registration of the terminal information is requested through the communication interface unit;

an authentication unit which, when the authentication request signal is received through the communication interface unit, decrypts the terminal information included in the authentication request signal and performs the user authentication based on whether the decrypted terminal information is present in the terminal information database;

an authentication key generation unit which, when the user is authenticated, generates the authentication key for the CPNS; and an authentication key supply unit which encrypts the generated authentication key using the password included in the terminal information and supplies the encrypted authentication key to a corresponding user terminal through the communication interface unit.

3. The system of claim 1, wherein the terminal information comprises at least one selected from the group consisting of an ID, a password, a terminal serial number, a terminal model, and a terminal type.

4. A user terminal, comprising:

a communication interface unit which transmits and receives information through a communication network;

an input unit which receives a user command;

an encryption unit which, when an ID and password for use of a CPNS are input through the input unit, encrypts terminal information including the ID and password using the password;

an authentication request unit which transmits an authentication request signal including the encrypted terminal information to a gateway through the communication interface unit;

an authentication key management unit which receives an authentication key, generated by a CPNS device in response to the authentication request, from the gateway and stores the received authentication key;

an authentication key generation unit which, when the ID and password for the use of the CPNS are input through the input unit, stores the ID and password and, at the same time, generates an authentication key; and an authentication supply unit which encrypts the terminal information including the ID and password and the generated authentication key and transmits the encrypted terminal information and authentication key to the CPNS device.

5. The user terminal of claim 4, further comprising a terminal information registration request unit which transmits the terminal information including the ID and password input through the input unit to the gateway through a short-range wireless communication network to request the CPNS device to register the terminal information.

6. The user terminal of claim 5, wherein the terminal information registration request unit encrypts the terminal information including the ID and password using the password and transmits the encrypted terminal information to the gateway through the short-range wireless communication network to request the CPNS device to register the terminal information.

7. The user terminal of claim 4, further comprising a service execution unit which executes the CPNS using the authentication key.

\* \* \* \* \*